(12) United States Patent
Zauritz

(10) Patent No.: US 10,479,315 B2
(45) Date of Patent: Nov. 19, 2019

(54) AIRBAG WITH ATTACHMENT FOR A GAS GENERATOR

(71) Applicant: AUTOLIV DEVELOPMENT AB, Vargarda (SE)

(72) Inventor: Ralf Zauritz, Holzkirchen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 146 days.

(21) Appl. No.: 15/743,809

(22) PCT Filed: Jul. 19, 2016

(86) PCT No.: PCT/EP2016/067133
§ 371 (c)(1),
(2) Date: Jan. 11, 2018

(87) PCT Pub. No.: WO2017/013094
PCT Pub. Date: Jan. 26, 2017

(65) Prior Publication Data
US 2018/0201223 A1    Jul. 19, 2018

(30) Foreign Application Priority Data

Jul. 22, 2015  (DE) .................. 10 2015 111 873

(51) Int. Cl.
*B60R 21/2346*   (2011.01)
*B60R 21/217*    (2011.01)
(Continued)

(52) U.S. Cl.
CPC ........ *B60R 21/2346* (2013.01); *B60R 21/217* (2013.01); *B60R 21/235* (2013.01);
(Continued)

(58) Field of Classification Search
CPC .................. B60R 21/231; B60R 21/2346
See application file for complete search history.

(56) References Cited

U.S. PATENT DOCUMENTS

| 5,090,729 A | 2/1992 | Watanabe |
| 5,316,337 A * | 5/1994 | Yamaji ..................... D05B 9/00 |
| | | 280/728.1 |

(Continued)

FOREIGN PATENT DOCUMENTS

| DE | 40 40 096 A1 | 6/1991 |
| DE | 199 46 413 A1 | 4/2000 |

(Continued)

OTHER PUBLICATIONS

International Search Report of PCT/EP2016/067133 dated Oct. 26, 2016.

*Primary Examiner* — Nicole T Verley
(74) *Attorney, Agent, or Firm* — Brinks Gilson & Lione

(57) ABSTRACT

An airbag (1) including two opposing side walls (3) a lower wall (4) and an upper wall (5) forming an inflation opening (2) and a front wall (6). The airbag (1) is formed by sections of a one-part cut fabric (7). The upper wall (5) or the lower wall (4) is formed by two sections (8) of the cut fabric (7) along a connection (9), wherein the cut fabric (7) is folded and only the upper wall (5) or only the lower wall (4) is formed from two sections (8) and from the inflation opening (2) one connection (9) of the one-part cut fabric (7) extends toward the front wall (6). The one-part cut-fabric (7) forms a fitting section (10) for a gas generator. In a flatly extended state the fitting section (1) is adjacent to the two sections (8) forming lower wall (4) or the upper wall (5).

12 Claims, 9 Drawing Sheets

(51) Int. Cl.
  *B60R 21/235* (2006.01)
  *B60R 21/264* (2006.01)

(52) U.S. Cl.
  CPC ... *B60R 21/264* (2013.01); *B60R 2021/23509* (2013.01); *B60R 2021/23538* (2013.01); *B60R 2021/23566* (2013.01); *B60R 2021/23576* (2013.01)

(56) References Cited

U.S. PATENT DOCUMENTS

| | | | | |
|---|---|---|---|---|
| 5,454,594 | A * | 10/1995 | Krickl | B60R 21/231 280/728.1 |
| 5,529,340 | A * | 6/1996 | Fairbanks | B60R 21/231 280/728.1 |
| 5,632,506 | A * | 5/1997 | Shellabarger | B60R 21/2171 280/728.1 |
| 5,836,612 | A * | 11/1998 | Lang | B60R 21/231 280/743.1 |
| 5,975,571 | A * | 11/1999 | Ford | B60R 21/231 280/743.1 |
| 6,299,206 | B1 * | 10/2001 | Keshavaraj | B60R 21/231 280/729 |
| 6,371,509 | B1 | 4/2002 | Ellerbrok et al. | |
| 7,073,818 | B2 * | 7/2006 | Hasebe | B60R 21/233 280/729 |
| 7,240,918 | B2 * | 7/2007 | Yamada | B60R 21/231 280/739 |
| 7,461,861 | B2 * | 12/2008 | Keshavaraj | B60R 21/233 280/743.1 |
| 7,866,693 | B2 * | 1/2011 | Onohara | B60R 21/231 280/743.1 |
| 7,922,198 | B2 * | 4/2011 | Urushibata | B60R 21/235 280/728.1 |
| 2013/0056966 | A1 | 3/2013 | Miyata | |

FOREIGN PATENT DOCUMENTS

| | | |
|---|---|---|
| DE | 10 2014 001 506 A1 | 8/2015 |
| EP | 1 072 481 A2 | 1/2001 |
| EP | 2 662 245 A1 | 11/2013 |
| EP | 2 358 568 B1 | 11/2014 |
| JP | 2002-046561 A | 2/2002 |
| JP | 2002-160599 A | 6/2002 |
| JP | 2011-046370 A | 3/2011 |
| JP | 2012-250583 A | 12/2012 |
| WO | WO 1996/05986 A1 | 2/1996 |
| WO | WO 1999/03706 A2 | 1/1999 |
| WO | WO 2002/016175 A2 | 2/2002 |
| WO | WO 2002/032725 A1 | 4/2002 |
| WO | WO 2013/077230 A1 | 5/2013 |
| WO | WO 2015/117752 A1 | 8/2015 |

* cited by examiner

AIRBAG WITH ATTACHMENT FOR A GAS GENERATOR

CROSS-REFERENCE TO RELATED APPLICATIONS

This application is a 35 U.S.C. § 371 national phase application of PCT International Application No. PCT/EP2016/067133, filed Jul. 19, 2016, which claims the benefit of priority under 35 U.S.C. § 119 to Germany Patent Application No. 102015111873.4, filed Jul. 22, 2015, the contents of which are incorporated herein by reference in their entirety.

FIELD OF THE INVENTION

The present invention relates to an airbag including a rear-side inflation opening, two mutually opposing side walls, a lower wall and upper wall each connecting to the inflation opening, and a front wall facing the occupant, wherein in regions of the side walls adjacent to the inflation opening, the lower wall, and the upper wall, the airbag having sections of a one-part cut fabric, and at least the upper wall or the lower wall in the region adjacent to the inflation opening is formed by two sections of the cut fabric that are connected to each other along a connection emanating from the inflation opening.

BACKGROUND

An airbag having the above-mentioned features is known from EP 2 358 568 B1, in which both the upper wall and the lower wall are formed from two sections of the one-part cut fabric, so that a connection of the sections respectively extends over the upper wall and the lower wall. Furthermore, the holes for the pass-through of the stay bolts of a gas generator are formed directly in the upper wall and/or the lower wall of the airbag, which are tensioned during a deployment of the airbag, so that a particular loading occurs in the region of these holes. In addition, these holes in the cut fabric are disposed relatively close to one edge of the section for forming the upper wall or the lower wall, which could lead to a further weakening of this region.

The object of the present invention is therefore to at least partially solve the problems described with respect to the prior art, and in particular to specify an airbag that can withstand higher loads.

SUMMARY AND INTRODUCTORY DESCRIPTION OF THE INVENTION

The above-described object is achieved by an airbag having the features described herein.

The object is achieved in particular by an airbag having a construction wherein the cut fabric is cut and folded such that either only the upper wall or only the lower wall in the region adjacent to the inflation opening is formed from two sections of the one-part cut fabric, and starting from the inflation opening, only one connection connecting the two sections of the one-part cut fabric extends toward the front wall, wherein in the region of the inflation opening the one-part cut fabric additionally forms, with at least one fitting section, a fitting for a gas generator, wherein in a flatly extended state of the cut fabric the at least one fitting section is disposed adjacent to the two sections of the cut fabric, which sections form either the lower wall or the upper wall in the region adjacent to the inflation opening.

It is thus made possible that the only connection emanating from the inflation opening can be embodied as an overlap seam, which can support the largest forces under load. This is just achieved by the cut fabric being cut and folded such that only one connection emanates from the inflation opening. Due to the embodiment of the fitting with the one-part cut fabric it is also achieved that the stay bolts of the gas generator are not only guided through a section of the cut fabric that forms a wall, but rather also through a section of the one-part fabric section that is not tensioned in the inflated state of the airbag. Thus the load of the cut fabric is reduced in the inflated cutting. In addition it is thus achieved that in the vicinity of the regions of the airbag adjacent to the inflation opening, wherein in the activation case the relatively hot gas of the gas generator impinges on the cut fabric, only a single seam is formed. This is in particular an overlap seam and thus particularly resistant to inflation damage.

An overlap seam is understood in particular to be such a seam in which the edges of the sections that are opposing and stitched to one another are disposed on opposing sides of the seam. Such seams are also known as shear seams. With peel seams, however, the edges of the sections lying one-over-the-other and stitched to one another are disposed on the same side with respect to the seam. Such seams are also known as peel seams.

In the folded and self-connected state the one-part cut fabric forms the airbag at least in regions adjacent to the inflation opening, wherein the various sections of the cut fabric in particular form the side walls directly adjacent to the inflation opening, the lower wall, and the upper wall, as well as the fitting. Preferably the one-part cut fabric can also form the front wall. Alternatively, a region of the airbag not adjacent to the inflation opening can be formed from a second cut fabric. In particular, the front wall is formed from the second cut fabric. Before the cut fabric is folded and connected to itself, the fitting section forming the fitting is disposed near or between the sections of the cut fabric, which after the folding form the upper wall or the lower wall in the region adjacent to the inflation opening. In the assembled state, the stay bolts of the gas generator are in particular guided both through the fitting formed by the fitting section as well as through one of the one or more sections of the wall formed by the one-part cut fabric. In the simplest case, the fitting is formed by the one-layer fitting section of the one-part cut fabric. However, it is preferred that the fitting section of the one-part cut fabric is folded onto itself and the fitting is thus formed in a multi-layer manner.

It can be provided that in a flatly extended state of the cut fabric, the sections forming either the upper wall or the lower wall are disposed laterally with respect to the fitting section, and for forming the upper or the lower wall with the folding of the cut fabric are oriented in particular with their main extension directions parallel to each other, so that their edges can be connected to each other using an overlap seam. In the flatly extended state, the sections forming the upper or the lower wall preferably extend with their longitudinal extension emanating from the fitting section in opposite directions and are folded to form the airbag such that they extend parallel to each other.

In one preferred embodiment it is provided that the sections of the cut fabric forming either the upper wall or the lower wall have a different width. The width here is to be determined transverse to the longitudinal extension of the corresponding sections forming either the upper wall or the lower wall. Due to the different widths, the one-part cut fabric is thus formed asymmetrically. This also means in particular that the connection formed in the upper wall or in the lower wall is formed offset with respect to the center of the corresponding wall. This has the advantage in particular that the corresponding connection does not directly extend on the central region of the fitting, whereby it is strengthened. In addition, a connection not disposed centrally in the lower or the upper wall is simpler to manufacture. From a fabric sheet out of which the one-part cut fabric is cut, a further component of the airbag can be cut out in a free region generated by the asymmetry.

In addition, it can be provided that with folding of the cut fabric, the fitting section formed between the two sections which form the upper wall or the lower wall is folded in the interior of the airbag in particular for forming a triangular or trapezoidal fitting. In this case the fitting formed from the fitting section is designed in multi-layers, in particular two-layers, and is thus more stable.

The regions of the airbag on which the gas exiting from the gas generator initially impinges and that are adjacent to the inflation opening are formed from the one-part cut fabric. The side walls, the lower wall, and the upper wall are preferably formed completely of the one-part cut fabric. It is thus provided that in particular a part of the front wall is formed of a second cut fabric, which is stitched to the one-part cut fabric.

It can be provided in particular that the connecting seam between the one-part cut fabric and the second cut fabric extends obliquely, in particular at an angle between 20 and 80, and preferably between 30 and 60 degrees with respect to the seams for stitching the airbag, which seams are adjacent to the connecting seam. This also means in particular that the second cut fabric has a side edge that is oriented with a corresponding side angle with respect to the adjacent side edges. This has the advantage that the second cut fabric can be cut out from a corresponding point from the fabric sheet, from which the one-part cut fabric is also cut out, so that only a small amount of waste occurs. This is in particular the case when the second cut fabric is disposed in the fabric sheet adjacent to one of the sections of the one-part cut fabric forming the side walls.

In one embodiment, it is provided that the sections forming the upper wall or the lower wall are connected to each other using an overlap seam, and the other seams connecting the sections are formed as peel seams. In particular, all other seams are formed from exactly one continuous peel seam. The airbag can thus be stitched together with exactly two seams. This is in particular also possible when a second cut fabric is stitched onto the one-part cut fabric using a peel seam and this passes uninterrupted into the seams connecting the other sections. In this case thus only the seam in the upper wall or the lower wall is formed by a particularly robust overlap seam.

However, it can alternatively also be provided that only directly adjacent edges of the cut fabric are connected to one another by a peel seam and that edges folded toward one another of the one-part cut fabric are connected to one another by an overlap seam.

It can be provided that the fitting section is delimited between the two sections that form the upper wall or the lower wall by cuts in the one-part cut fabric and is driven into the interior of the airbag for forming the fitting. The fitting section is then in particular directly connected to the section of the cut fabric, which forms the wall opposite the wall formed by the two sections.

Alternatively it can also be provided that the cut fabric is cut and folded such that the fitting is formed in a trapezoidal shape, wherein after the folding and driving-in of the fitting in particular into the airbag interior, the gas generator is introduced into the airbag interior through an opening formed in the fitting. The opening through which the gas generator was introduced into the airbag interior is then closed by guiding the stay bolts through holes in the fitting section and attaching the gas generator to a housing of the airbag module. In particular it can thereby be provided that a part of the fitting section forming the fitting is turned onto an outer side of the airbag after introduction of the gas generator and pulled via holes over the stay bolts of the gas generator already guided through another part of the fitting section.

Alternatively it can be provided that the fitting section is folded outside onto the upper wall or the lower wall of the airbag.

Alternatively it can be provided that in a flatly extending state of the cut fabric, outer-lying edges of sections forming either the upper wall or the lower wall form aligning side edges of the flatly extending cut fabric. In this case the two sections are formed with the same width and in particular are symmetrical with respect to the fitting section.

If cuts for forming the fitting section are provided in the cut fabric, it can be provided in particular that in a flatly extending state of the cut fabric, outer-lying edges of the sections forming either the upper wall or the lower wall enclose an angle to one another of between 120° and 175°, and wherein the edges of the sections of the cut fabric forming the side walls, which edges are respectively to be connected to the front wall, have a circular-arc-shaped course, so that in the inflated state of the airbag the front wall has a curved shape facing the occupant.

In one embodiment of the airbag it is provided that for forming the front wall, the sections of the cut fabric forming the side walls extend out over the side walls and are connected to one another in the front wall, in particular by an overlap seam. A particularly strong connecting seam is thus also possible on the front wall.

In order that no connecting seam is formed on the front wall facing the occupant, it can be provided that two sections form the lower wall and for forming the front wall the section of the cut fabric forming the upper wall of the airbag extends out over the upper wall.

In order that in case of activation of the airbag the walls of the airbag are not directly impinged by the inflation gas escaping from the gas generator, it can be provided that the gas generator is disposed in a diffuser folded from a one-part fabric layer, which is attached to the fitting together with the gas generator and is matched in the region of the inflation opening to the shape of the airbag formed from the side walls, the upper wall, and the lower wall. In this context it is provided in particular that in the inflated state, the exhaust opening of the diffuser is directed toward the front wall.

The fabric layer for forming the diffuser is in particular rectangular in a flatly extended state, but it can also include projections or cutouts starting from the rectangle shape. The fabric layer is in particular folded and stitched to itself such that it is hexagonal in the folded state, wherein an exhaust opening can be formed on only one side edge. The fabric layer of the diffuser can itself also form a connecting section, so that the diffuser is multi-layered in a region in which the stay bolts of the gas generator are guided out of the diffuser. Due to the hexagonal design, in the region of the inflation opening of the airbag the diffuser is adapted to the shape of the airbag, wherein it is ensured by the exhaust opening that at least after an initial deployment phase the walls of the airbag are not impinged directly by the hot gas of the gas generator.

In one preferred embodiment, it can be provided in particular that for assembly the gas generator is initially inserted in the diffuser, so that it protrudes with the stay bolts from the diffuser. In the following the diffuser is united around the gas generator and introduced into the airbag interior through an opening in the fitting. The stay bolts of the gas generator are then guided out of the airbag for assembly through the holes in the fitting of the airbag and optionally through a wall of the airbag.

BRIEF DESCRIPTION OF THE DRAWINGS

The invention as well as the technical environment are explained in the following based on the figures, wherein it should be noted that the figures show preferred embodiments of the invention.

DETAILED DESCRIPTION

Figure 1:
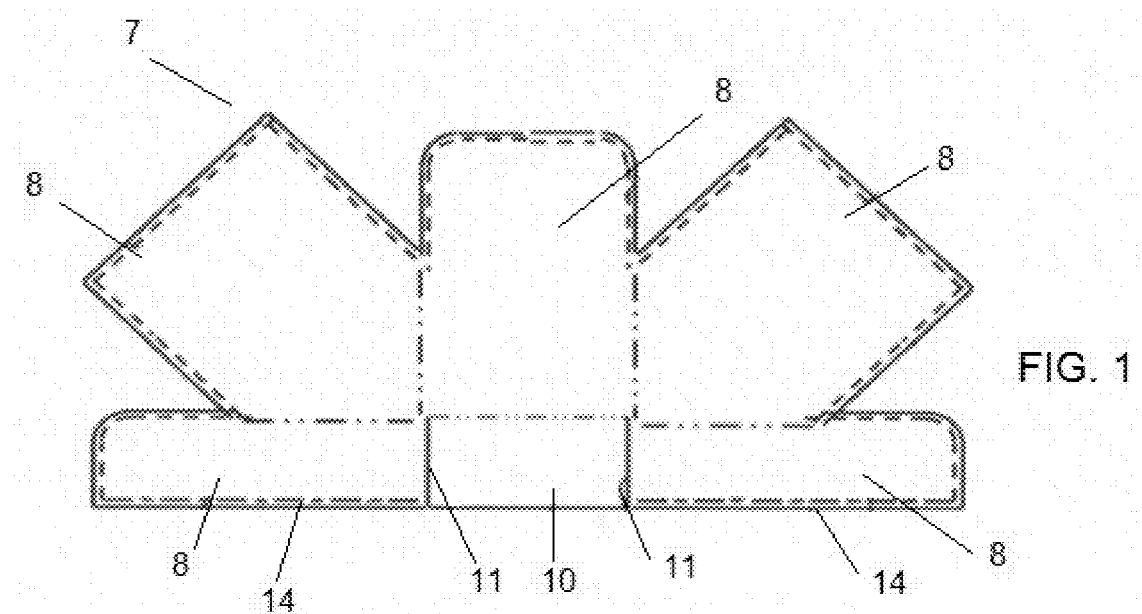
FIG. 1 schematically shows first embodiment of a cut fabric.
Figure 2:
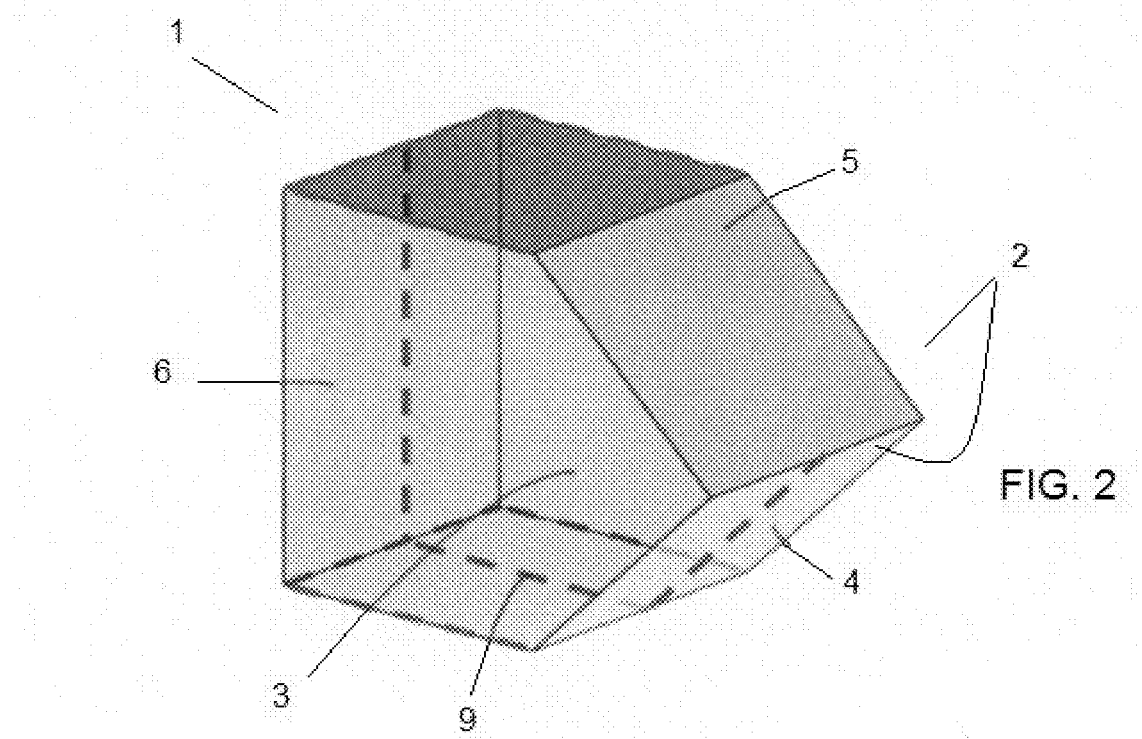
FIG. 2 schematically shows an airbag from the cut fabric according to FIG. 1.

The cut fabric 7 depicted in FIG. 1 includes sections 8 that form the walls of an airbag 1. The airbag 1 able to be made from the cut fabric 7 according to FIG. 1 is depicted in FIG. 2. The cut fabric 8 extending upward in FIG. 1 forms an upper wall 5 of the airbag 1. The sections 8 of the cut fabric 7, which sections are directed obliquely upward to the left and right, form the side walls 3 of the airbag 1 and extend over the side walls 3 out into a front wall 6, where they are connected to each other at their edges by an overlap seam. In addition the cut fabric 7 includes two laterally outwardly extending sections 8, which form the lower wall 4 and are connected to each other by an overlap seam along a connection 9 at their edges. Between the sections 8 forming the lower wall 4 a fitting section 10 is formed that is separated from the sections 8 forming the lower side wall 4 by cuts 11. The fitting section 10 is formed connected to the section 8 forming the upper wall 5.

For forming the airbag 1 depicted in FIG. 2, the cut fabric 7 is folded along the dash-dotted lines shown in FIG. 1 and connected to itself along the dashed lines shown in FIG. 2 with corresponding seams. The fitting section 10 here is folded in the region of inflation opening 2 into the interior of the airbag 1 and serves for fitting of a not-depicted gas generator. Stay bolts of the gas generator are guided out of the airbag 1 through the fitting section 10 forming a fitting and at least one wall of the airbag 1. The connecting seams of the airbag are depicted in FIG. 2 as dashed lines.

Figure 3:
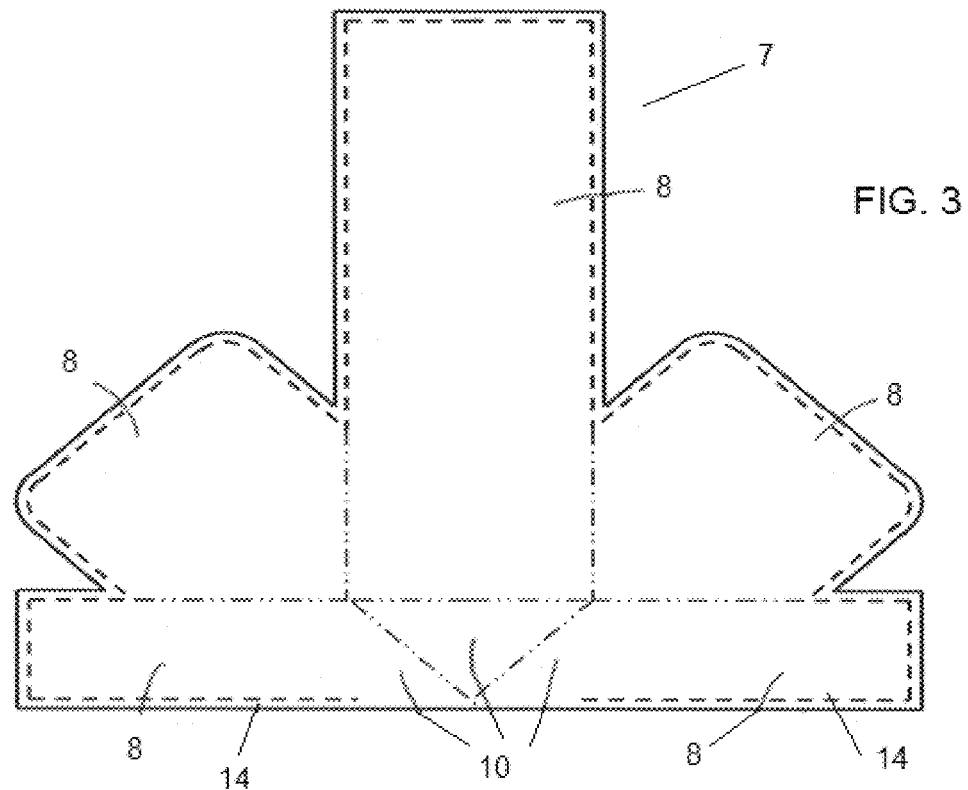
FIG. 3 schematically shows a second embodiment of a cut fabric.
Figure 4:
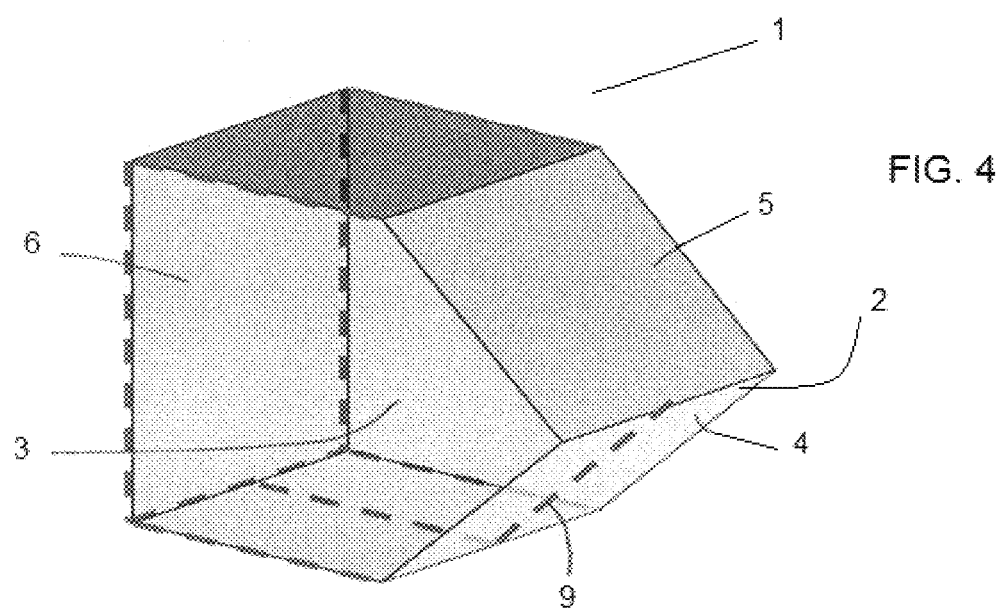
FIG. 4 schematically shows an airbag from the cut fabric according to FIG. 3.

In FIG. 3, a second embodiment of a cut fabric 7 is depicted, wherein the airbag 1 formed therefrom is shown in FIG. 4. In the following only the differences with respect to the embodiment according to FIGS. 1 and 2 are discussed here. On the one hand, in this embodiment, the upwardly extending section 8 of the cut fabric 7 is designed so long that, in addition to the upper wall 5, it forms the front wall 6 so that the front wall 6 is designed without a seam. A further difference from the first embodiment consists in that the fitting section 10 is not separated from the other sections of the cut fabric 7 by cuts. Rather, a fitting is formed by the fitting section 10 upon folding of the cut fabric 7. The fitting thus arising is configured in two-layers and triangular. Upon folding, namely the sections 8 forming the lower wall 4 (the sections 8 formed at the bottom of FIG. 3 near the fitting section 10) are folded along the fold lines in the fitting section 10 indicated by dash-dotted lines, so that the sections 8 are directed parallel to each other. The triangular fitting thus arising can subsequently be pulled into the interior of the airbag 1.

Figure 5:
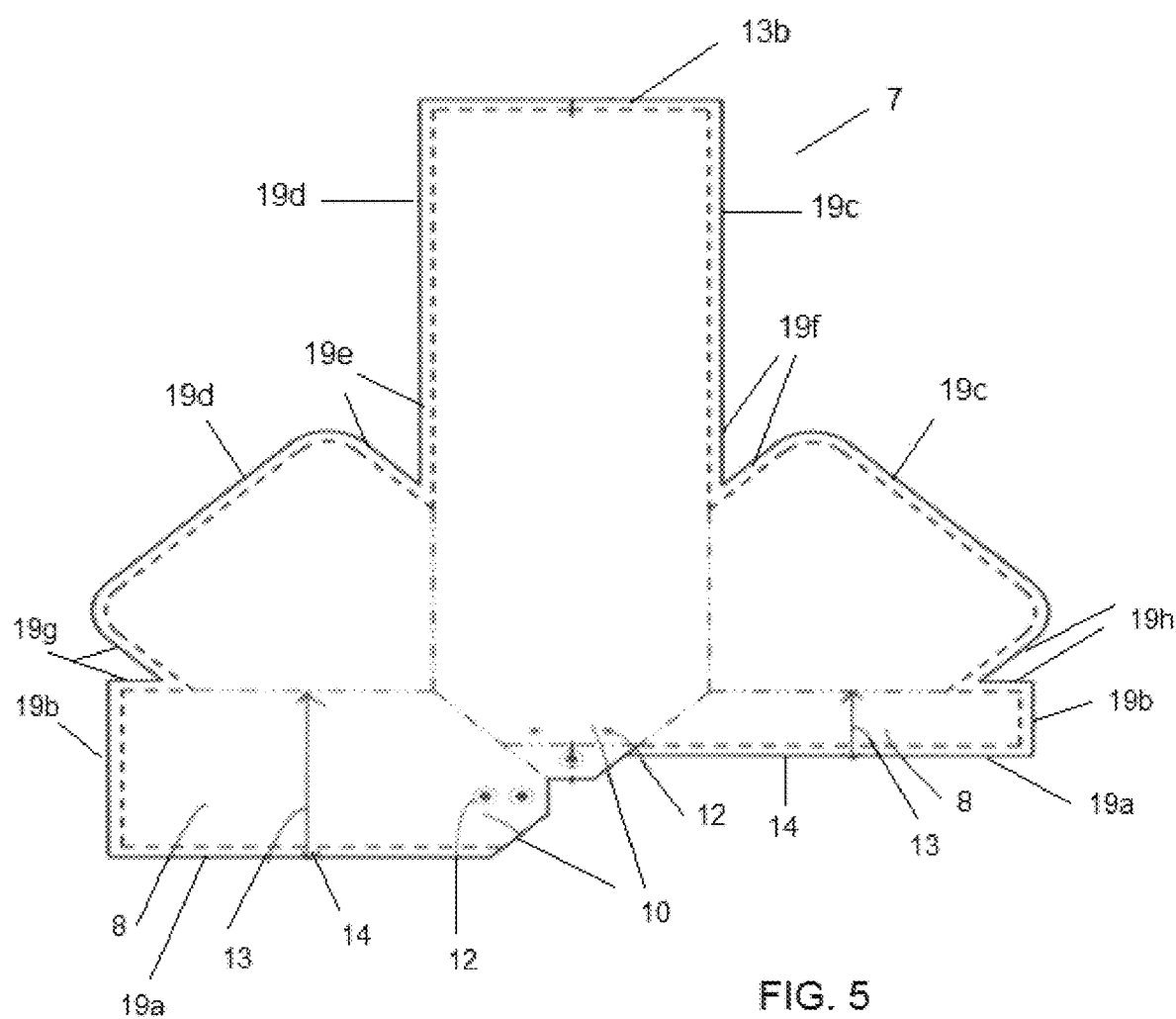
FIG. 5 schematically shows a third embodiment of a cut fabric.

A further embodiment of a cut fabric 7 is depicted in FIG. 5, wherein predominantly the differences from the second embodiment are discussed. The sections 8 forming the lower side wall 4 have a different width 13 transverse to their longitudinal direction. The cut fabric 7 is thus asymmetric in this regard. In addition the depicted embodiment of the fitting section 10 allows a gas generator (not shown) to initially be introduced through the opening in the airbag 1 remaining in the fitting after the folding of the cut fabric 7 and connecting of the edges 14 of the sections 8 forming the lower wall 4, wherein a part of the fitting section 10 forming the fitting can impinge externally on the airbag 1 after introduction of the gas generator, wherein then the opening present for introducing the gas generator is essentially closed. Here the region of the fitting section 10 folded externally on the airbag 1 is pulled over the stay bolts of the gas generator guided out from the airbag 1. For this purpose holes 12 are formed in the fitting section 10 of the cut fabric 7.

In FIG. 5 it is also depicted which sections of the circumferential edge 19 of the cut fabric 7 are stitched to each other. Thus the sections 8 forming the lower wall 4 are connected to each other along the edges 19a by an overlap seam. The lateral edges 19b in FIG. 5 are connected to the edge 19b of the section 8 forming the front side by an overlap seam. The other edges 19c to 19h are each connected to one another by a peel seam.

Figure 12:
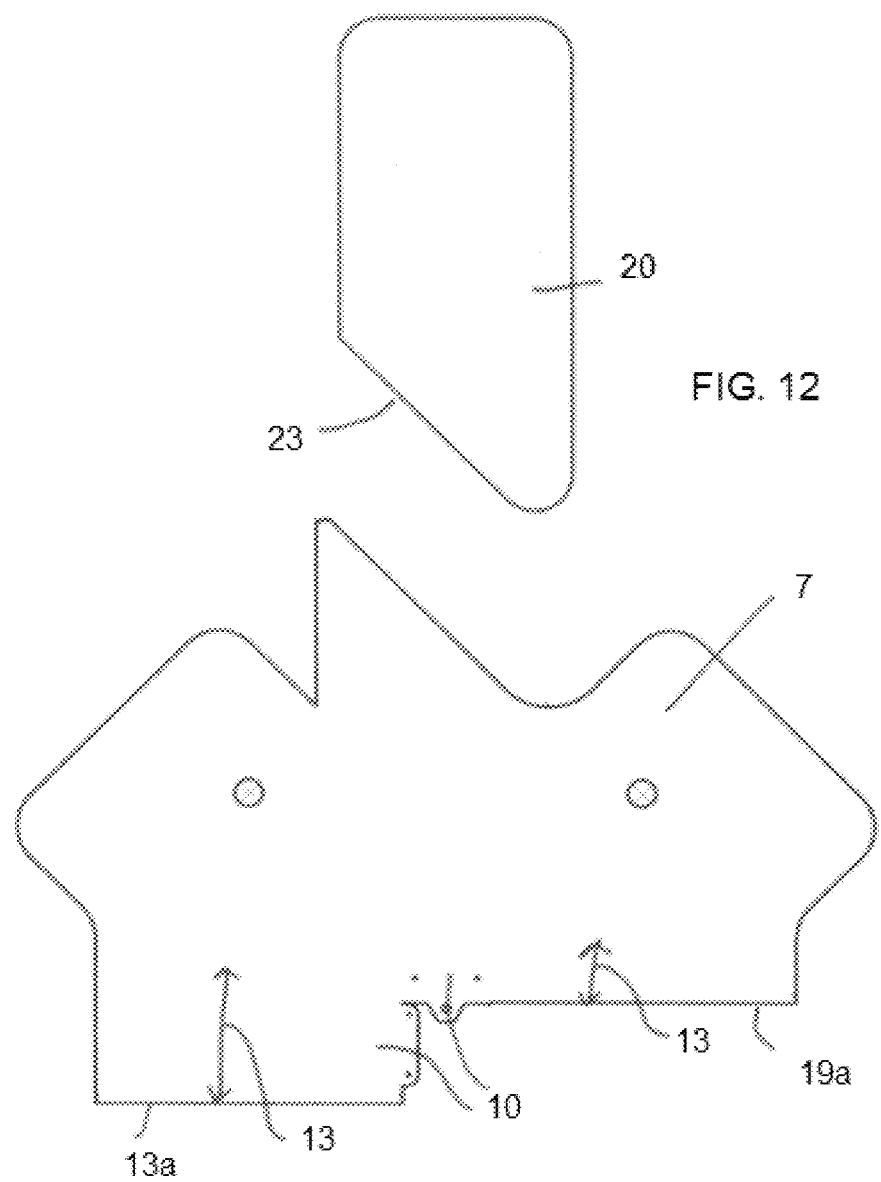
FIG. 12 schematically shows a fifth embodiment of a cut fabric.
Figure 13:
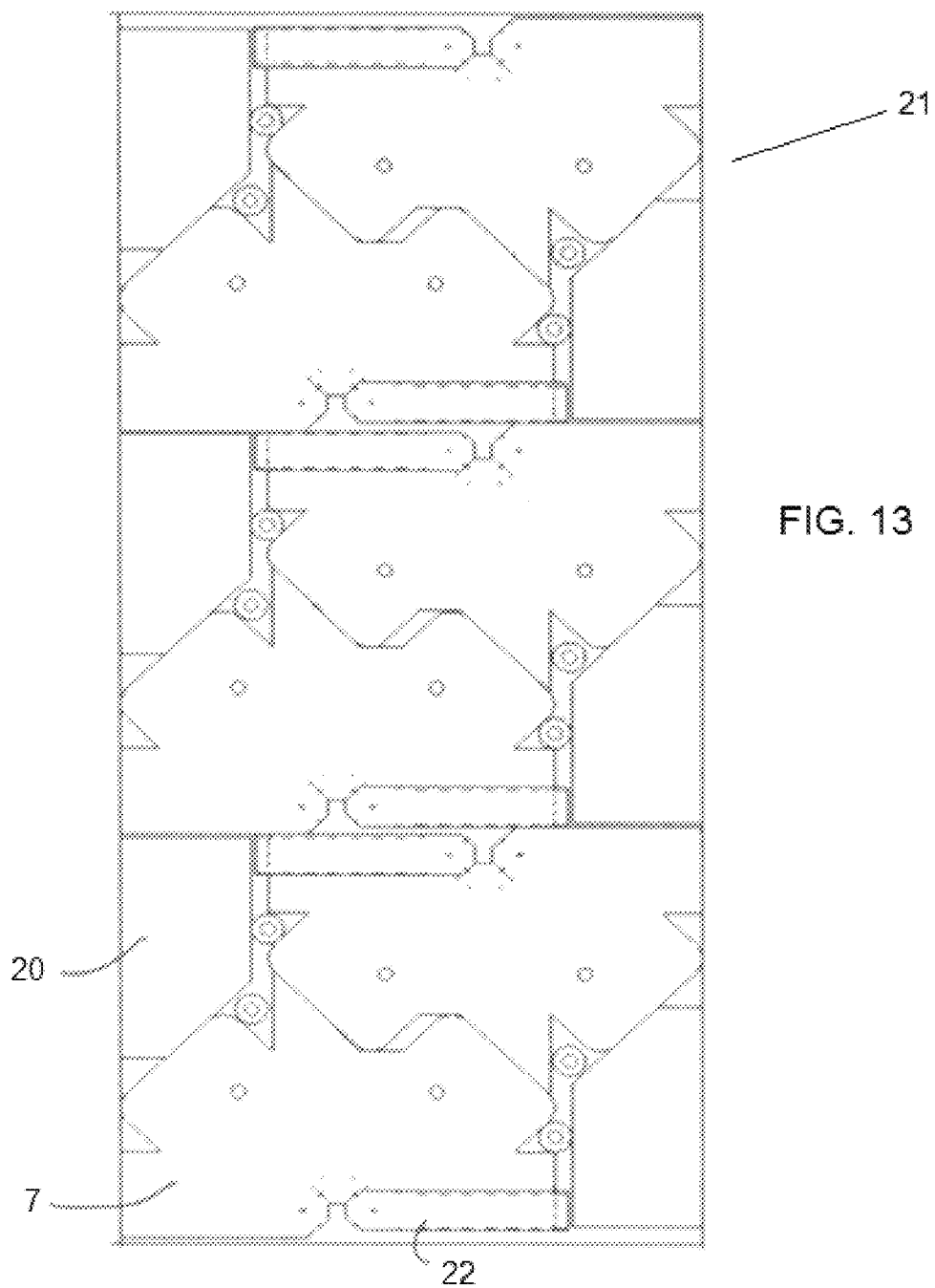
FIG. 13 schematically shows a fabric sheet from which the cut fabric according to FIG. 12 is cut out.

In FIG. 12 an embodiment is depicted wherein the airbag is formed from a one-part cut fabric 7 and a second cut fabric 20. As in the embodiment of FIG. 5 the cut fabric 7 includes two sections 8, having two different widths 13, for forming the lower wall 4 of the airbag 1. As a significant difference to the embodiment according to FIG. 5 the fabric section that forms the front wall 6 is formed by the second cut fabric 20 that is stitched to the one-part cut fabric 7. A connecting edge 23 of the second cut fabric 20 extends obliquely with respect to the adjacent edges of the second cut fabric 20. This has the advantage that all elements to be manufactured from a fabric for an airbag 1 can be cut out without significant waste from a single fabric sheet 21. A corresponding fabric sheet 21 is depicted in FIG. 13. Due to the oblique orientation of the connecting edge 23 with respect to the other edges of the second cut fabric 20, the second cut fabric 20 in the fabric sheet 21 can be directly adjacent to the section 8 of the one-part cut fabric 7 that forms the side wall 3 of the airbag 1. In addition it can be seen in FIG. 13 that due to the different width 13 of the sections 8 forming the lower wall 4 a retaining band 22 for the airbag 1 can be cut out in the thereby free region of the fabric sheet 21.

In the embodiment according to FIG. 12, the sections 8 forming the lower wall 4 are initially connected to one another along their edges 19a oriented parallel to one another by an overlap seam. In the following the second cut fabric 20 is connected to the cut fabric 7 along the connecting edge 23 by a peel seam, wherein in the following the peel seam is continued uninterrupted such that the other edges for forming the airbag 1 are also each connected to one another using a single continued peel seam.

Figure 6:
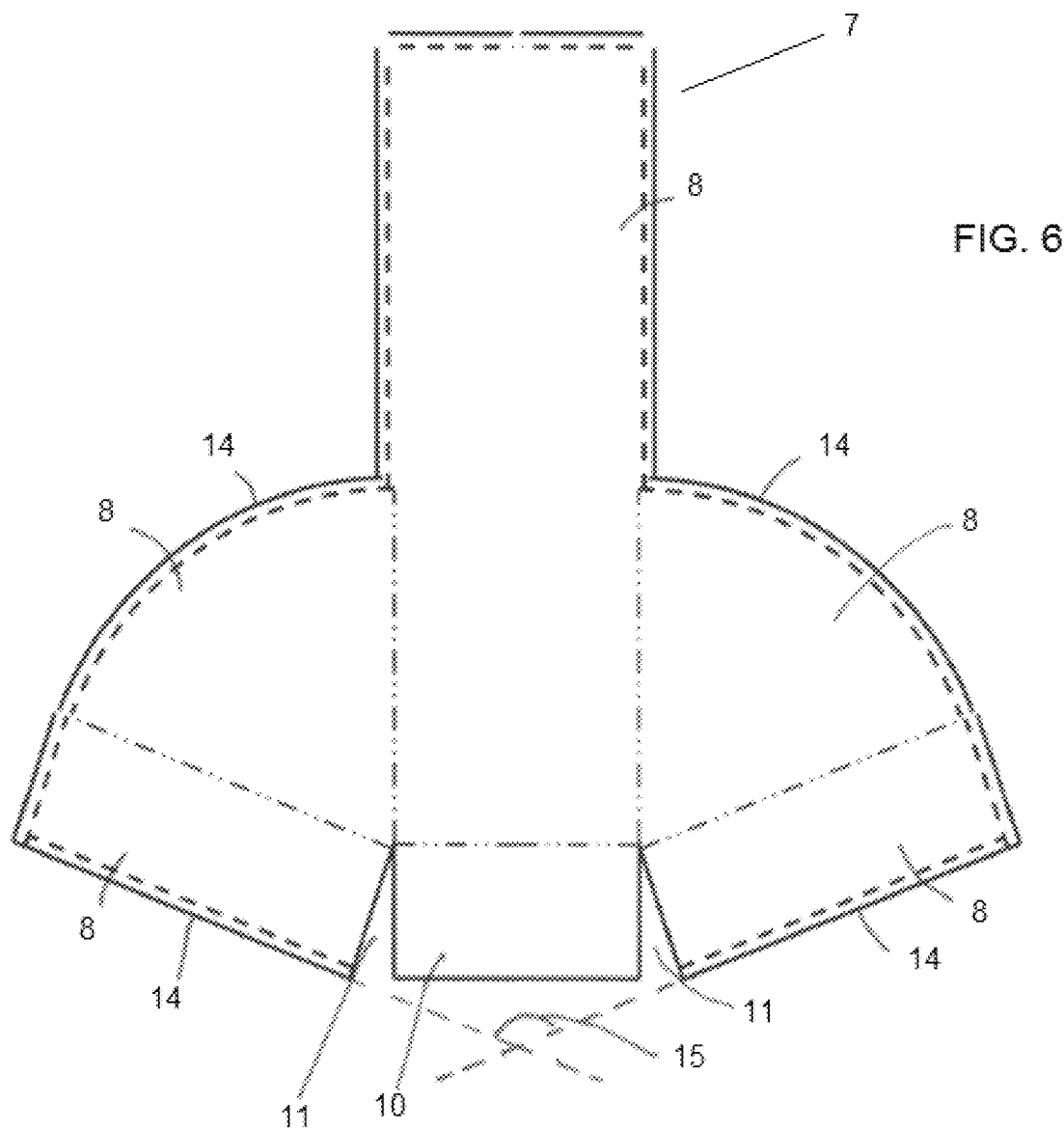
FIG. 6 schematically shows a fourth embodiment of a cut fabric.

A still further embodiment of a cut fabric 7 is depicted in FIG. 6, wherein the edges 14 of the sections 8 forming the lower wall 4 of the airbag 1 are not disposed aligned with respect to each other in a flatly extending state of the cut fabric 7, but enclose an angle 15 between them. The fitting section 10 is separated from the sections 8 forming the lower side wall 4 by cuts 11. The section 8 of the cut fabric 7, which section 8 extends upward from the fitting section 10, forms both the upper wall 5 and the front wall 6. In this embodiment, the sections 8 of the cut fabric 7, which sections 8 form the side walls 3, have a circular-arc-shaped edge 14, whereby it is made possible that the front wall 6 of the airbag 1 has a stronger curvature facing the occupant in the inflated state.

Figure 7:
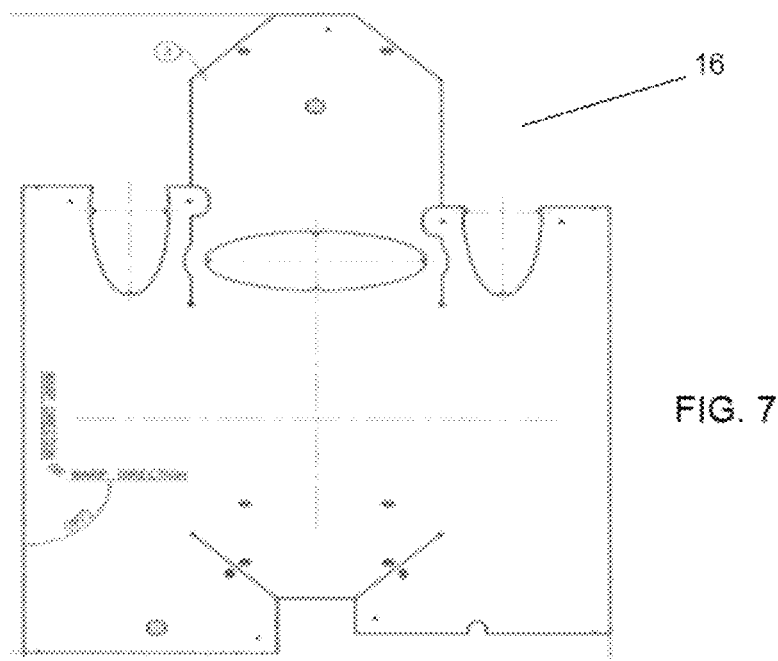
FIG. 7 schematically shows a fabric layer for a diffuser.

In FIG. 7, a fabric layer 16 is depicted in an extended and cut state, from which a diffuser 17 is manufactured. In the assembled state, a gas generator (not shown) is disposed in the diffuser 17 and attached together with the diffuser 17 in the airbag in the region of the inflation opening 2.

Figure 8:
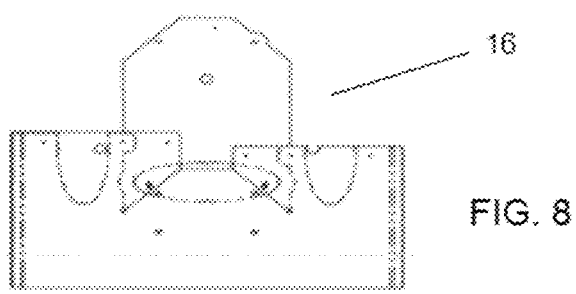
FIGS. 8-11 schematically shows folding and stitching steps for forming of a diffuser from the fabric layer according to FIG. 7.
Figure 9:
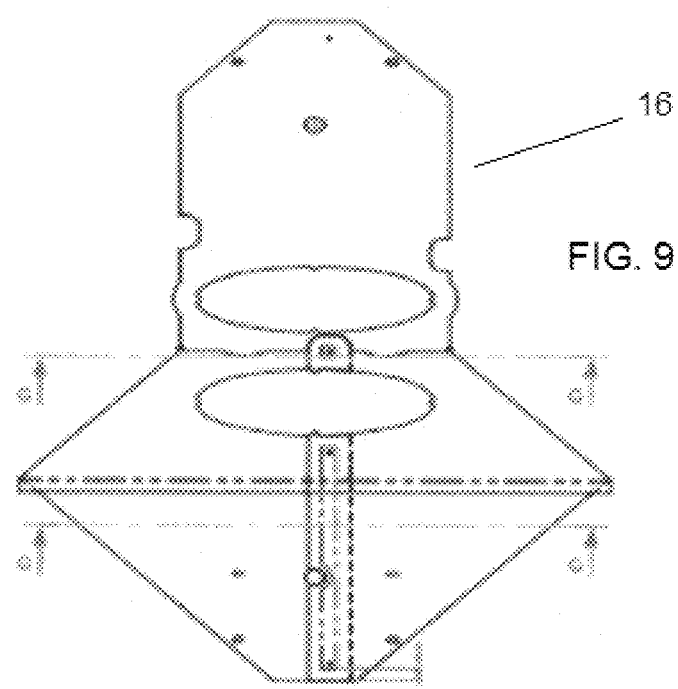
Figure 10:
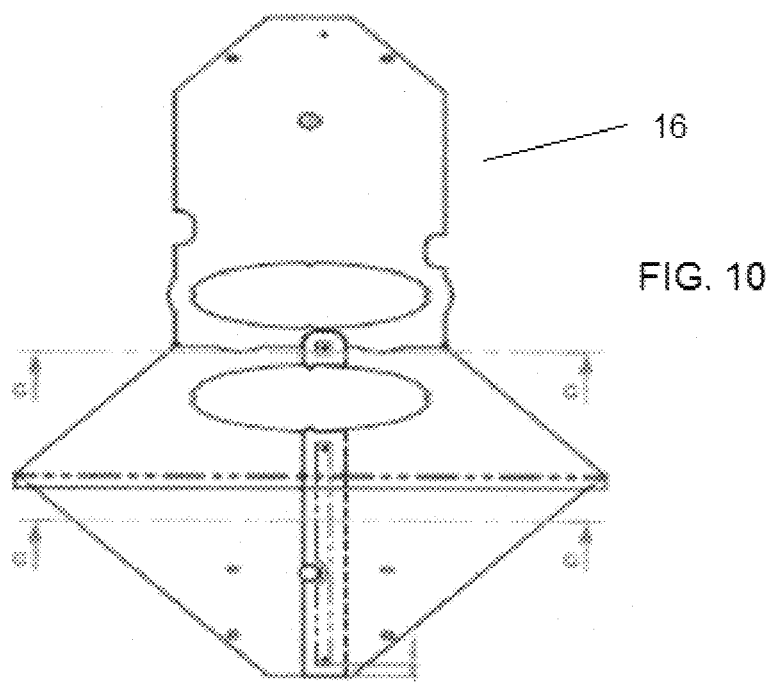
Figure 11:
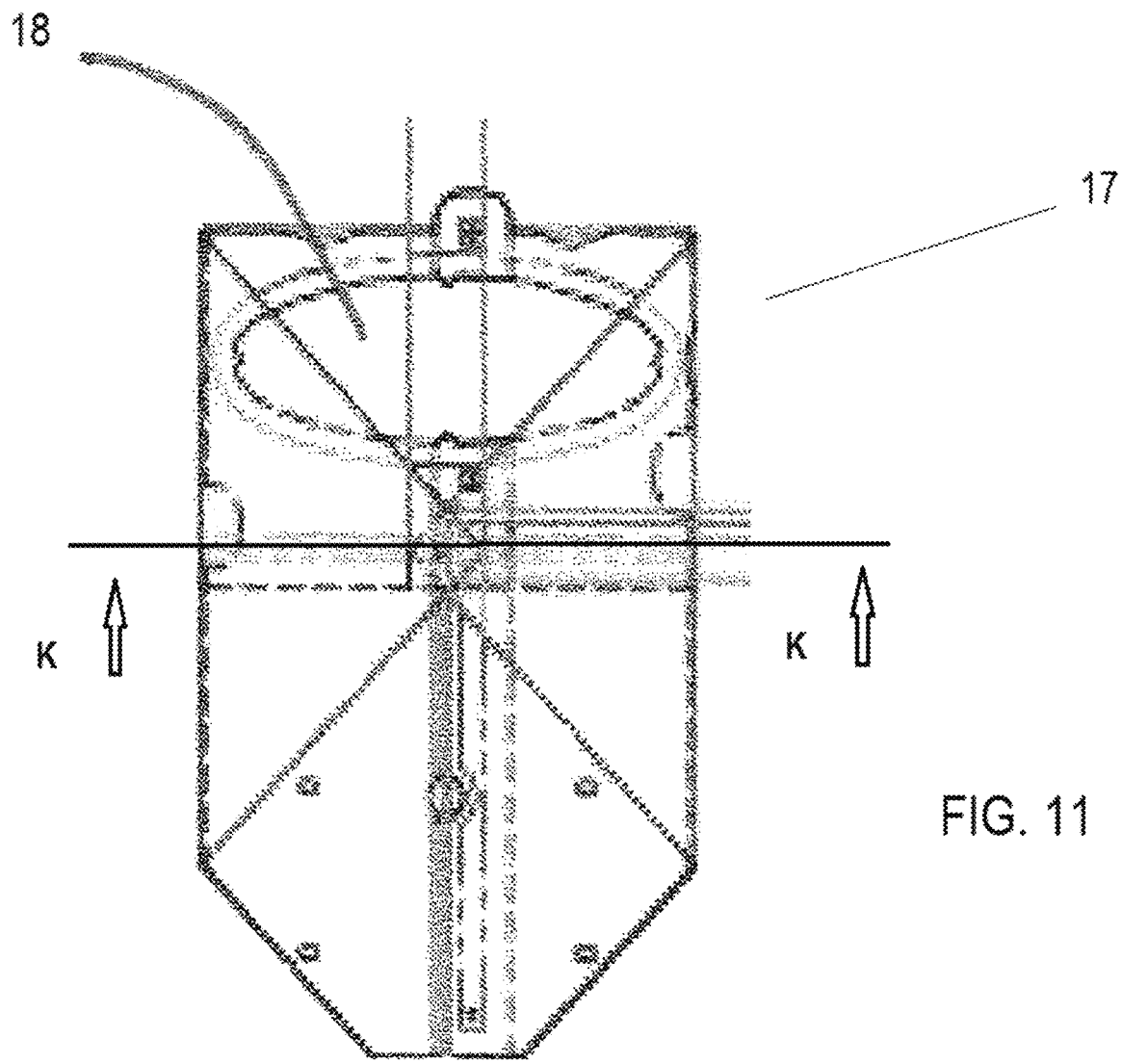

The fabric layer 16 is initially folded onto itself along a horizontal line and then stitched to itself on the lateral edges, as depicted in FIG. 8. In the following step the upper left corner and the upper right corner are folded inward to the fold line, wherein simultaneously the region of the fabric layer 16 including the cuts is pulled downward so that the previously formed connecting seem is vertically oriented (see FIG. 9). In the following step the upwardly protruding central region is folded downward (see FIG. 10).

Subsequently the outwardly pointing corners are each folded inward so that the diffuser 17 forms an exhaust opening 18. From below the gas generator can then be introduced into the diffuser 17. The diffuser 17 thus has an essentially hexagonal shape, wherein in the installed position the exhaust opening 18 is directed toward the front wall 6 of the airbag 1. In the airbag 1 the diffuser 17 has essentially the same shape as the shape in the region of the inflation opening 2, which shape is formed by the walls of the airbag 1.

While the above description constitutes the preferred embodiment of the present invention, it will be appreciated that the invention is susceptible to modification, variation and change without departing from the proper scope and fair meaning of the accompanying claims.

The invention claimed is:

1. An airbag for providing restraint for an occupant comprising a rear-side inflation opening, two mutually opposing side walls, a lower wall and an upper wall which abut an inflation opening, and a front wall facing the occupant, wherein in regions of the side walls, the lower wall and the upper wall adjacent to the inflation opening the airbag is formed of sections of a one-part cut fabric, and in the regions adjacent to the inflation opening at least the upper wall or the lower wall is formed by two sections of the cut fabric that are connected to each other along a connection emanating from the inflation opening, the cut fabric is cut and folded such that either only the upper wall or only the lower wall is formed from two sections of the one-part cut fabric and starting from the inflation opening only the connection connecting the two sections of the one-part cut fabric extends toward the front wall, wherein in the regions of the inflation opening the one-part cut-fabric additionally forms with at least one fitting section for a gas generator, wherein in a flatly extended state of the cut fabric the at least one fitting section is disposed adjacent to the two sections of the cut fabric forming either the lower wall or the upper wall in the regions adjacent to the inflation opening.

2. An airbag according to claim 1, further comprising in the flatly extended state of the cut fabric the sections forming either the upper wall or the lower wall are disposed laterally with respect to the fitting section and are oriented mutually parallel for forming the upper wall or the lower wall upon folding of the cut fabric.

3. An airbag according to claim 2, further comprising the sections forming either the upper wall or the lower wall each have a width which differ from one another.

4. An airbag according to claim 2, further comprising upon folding of the cut fabric the fitting section formed between the two sections in an interior of the airbag is folded for forming a triangular fitting or a trapezoidal fitting.

5. An airbag according to claim 1, wherein the side walls, the lower wall and the upper wall are completely formed from the one-part cut fabric.

6. An airbag according to claim 1, further comprising the sections forming the upper wall or the lower wall are connected to each other by an overlap seam, and other seams connecting the sections are configured as peel seams.

7. An airbag according to claim 2, further comprising the fitting section is formed between the two sections by one or more cuts in the cut fabric and for the formation of the fitting section is pressed into an interior of the airbag.

8. An airbag according to claim 7, further comprising in the flatly extended state of the cut fabric outer-lying edges of the sections forming either the upper wall or the lower wall enclose an angle with each other between 120° and 175°, and wherein the edges of the sections of the cut fabric forming the side walls, which are to be connected to the front wall, respectively have a circular-arc-shaped course.

9. An airbag according to claim 1, further comprising one or more holes are formed in the fitting section, through which one or more stay bolts of the gas generator are guided.

10. An airbag according to claim 8, further comprising in the flatly extended state of the cut fabric, outer-lying edges of the sections forming either the upper wall or the lower wall form aligning side edges of the flatly extended cut fabric.

11. An airbag according to claim 1, further comprising the gas generator is disposed in a diffuser folded from a one-part fabric layer, which is attached together with the gas generator to the fitting section and is matched in the region of the inflation opening to a shape of the airbag, which the shape is formed by the side walls, the upper wall and the lower wall.

12. An airbag according to claim 11, further comprising in an inflated state of the airbag an exhaust opening of the diffuser is directed toward the front wall.

* * * * *